Nov. 16, 1926. 1,606,927
W. DYRSSEN
METHOD OF OPERATING OPEN HEARTH FURNACES
Filed March 13, 1924 4 Sheets-Sheet 2
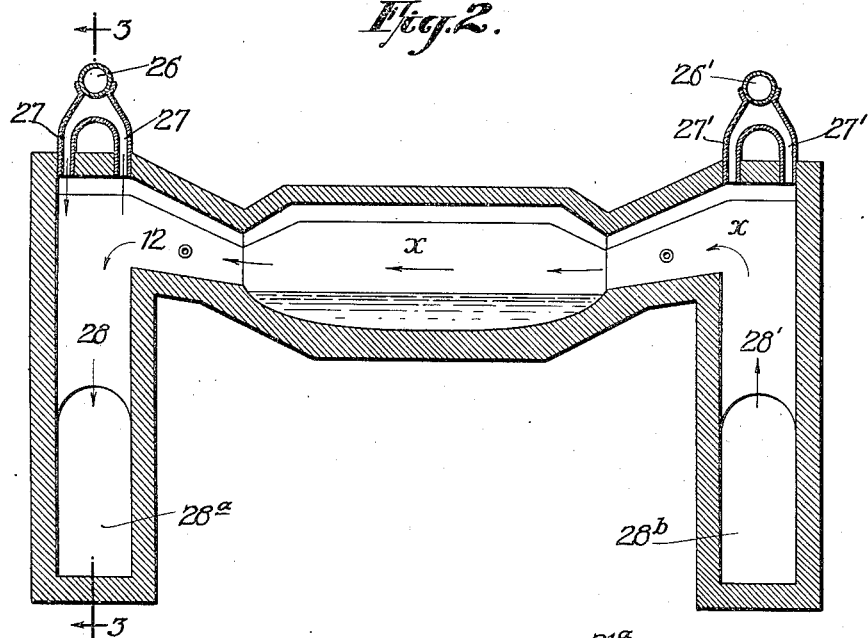
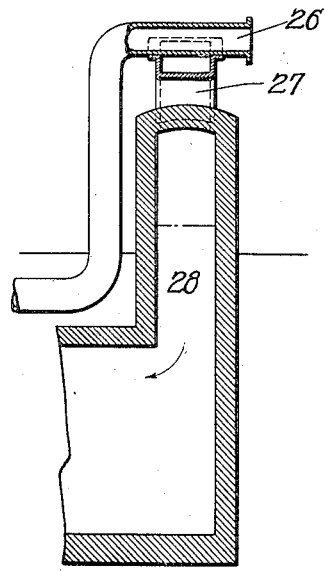
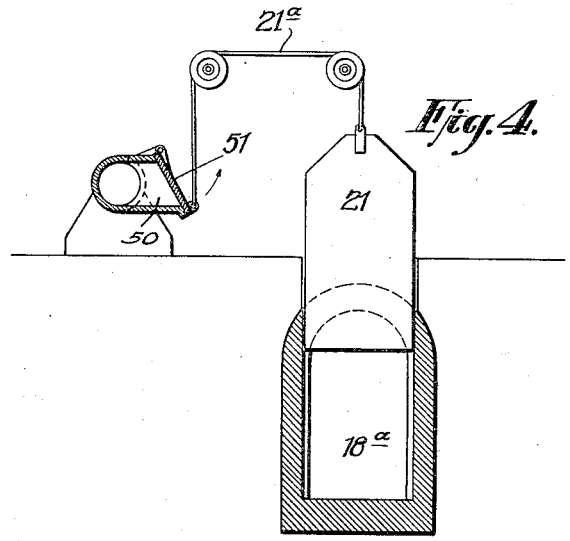
INVENTOR
Waldemar Dyrssen.
BY
ATTORNEY Nov. 16, 1926.
W. DYRSSEN
1,606,927
METHOD OF OPERATING OPEN HEARTH FURNACES
Filed March 13, 1924    4 Sheets-Sheet 3
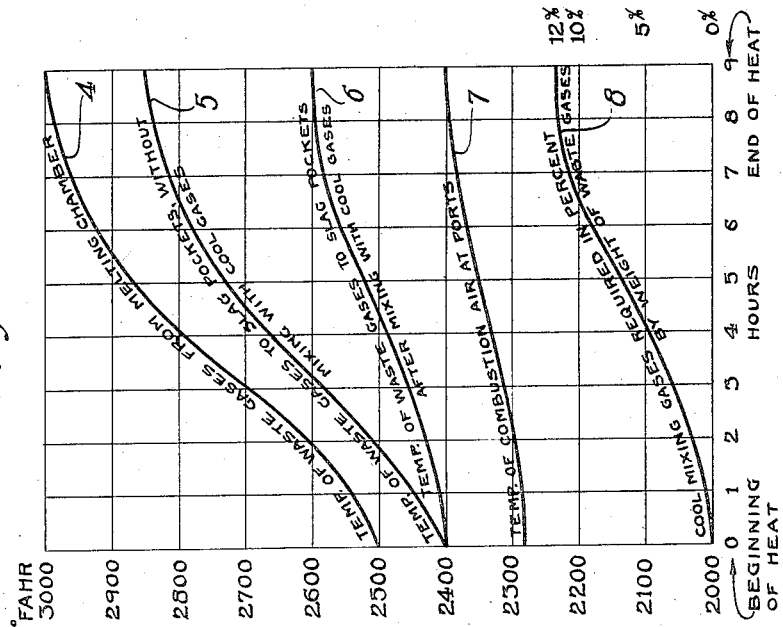
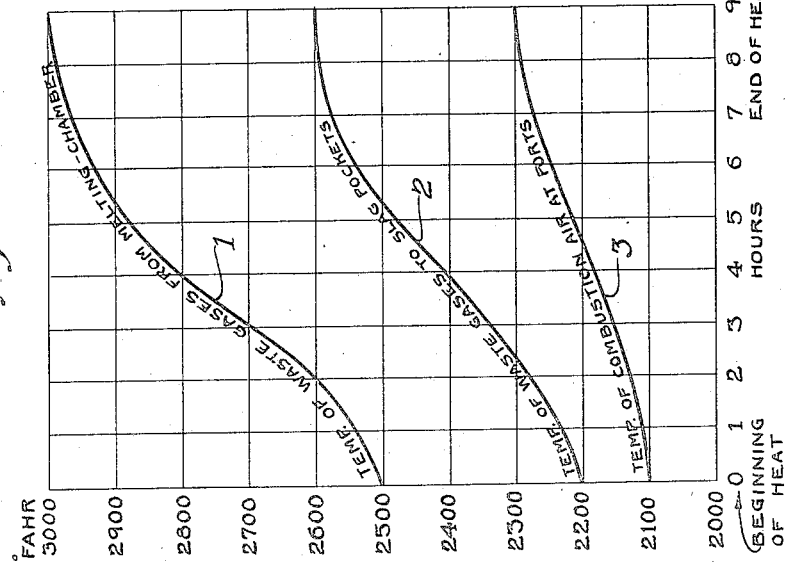
INVENTOR
Waldemar Dyrssen.
BY
D. Anthony Usina
ATTORNEY

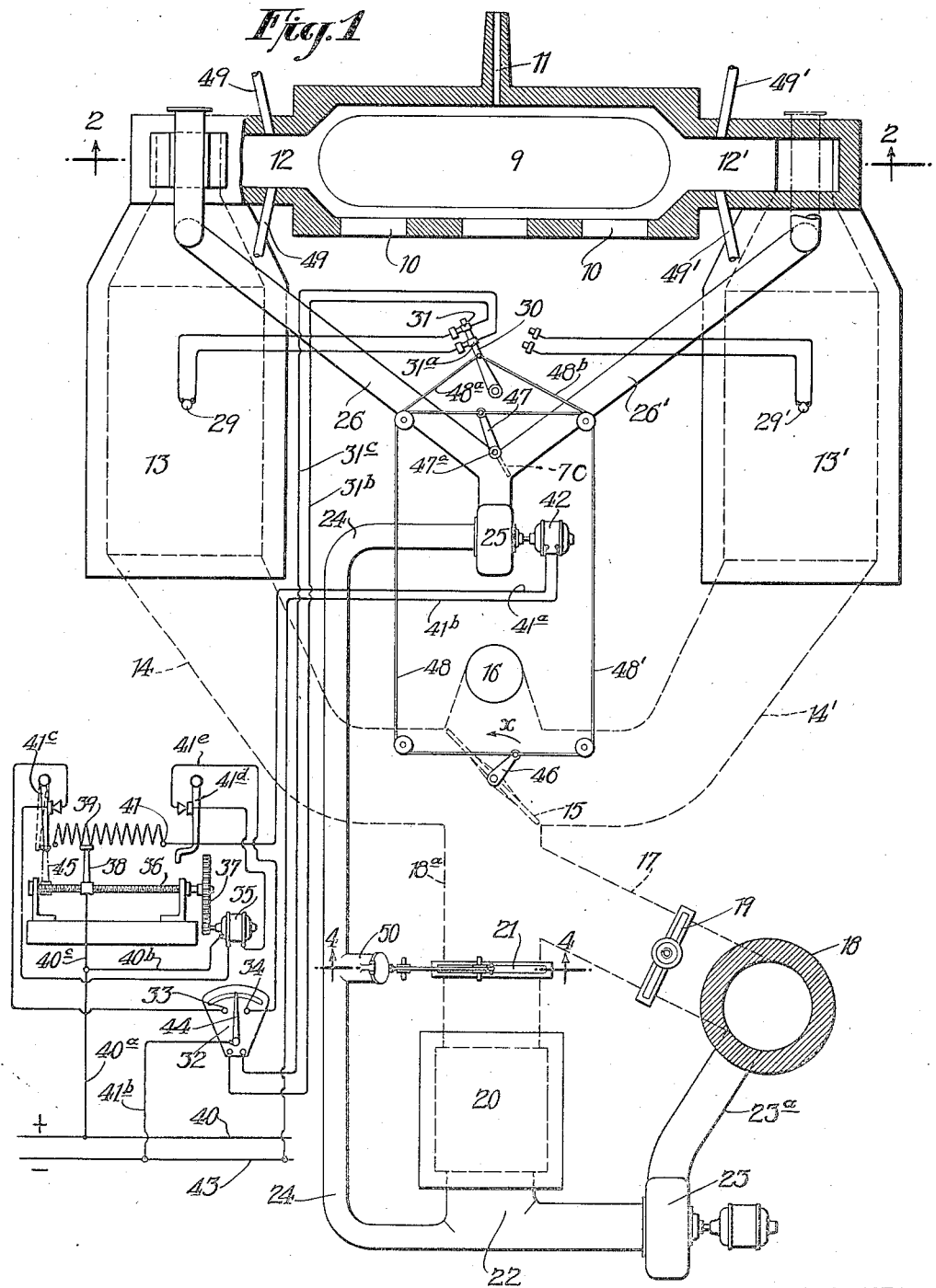

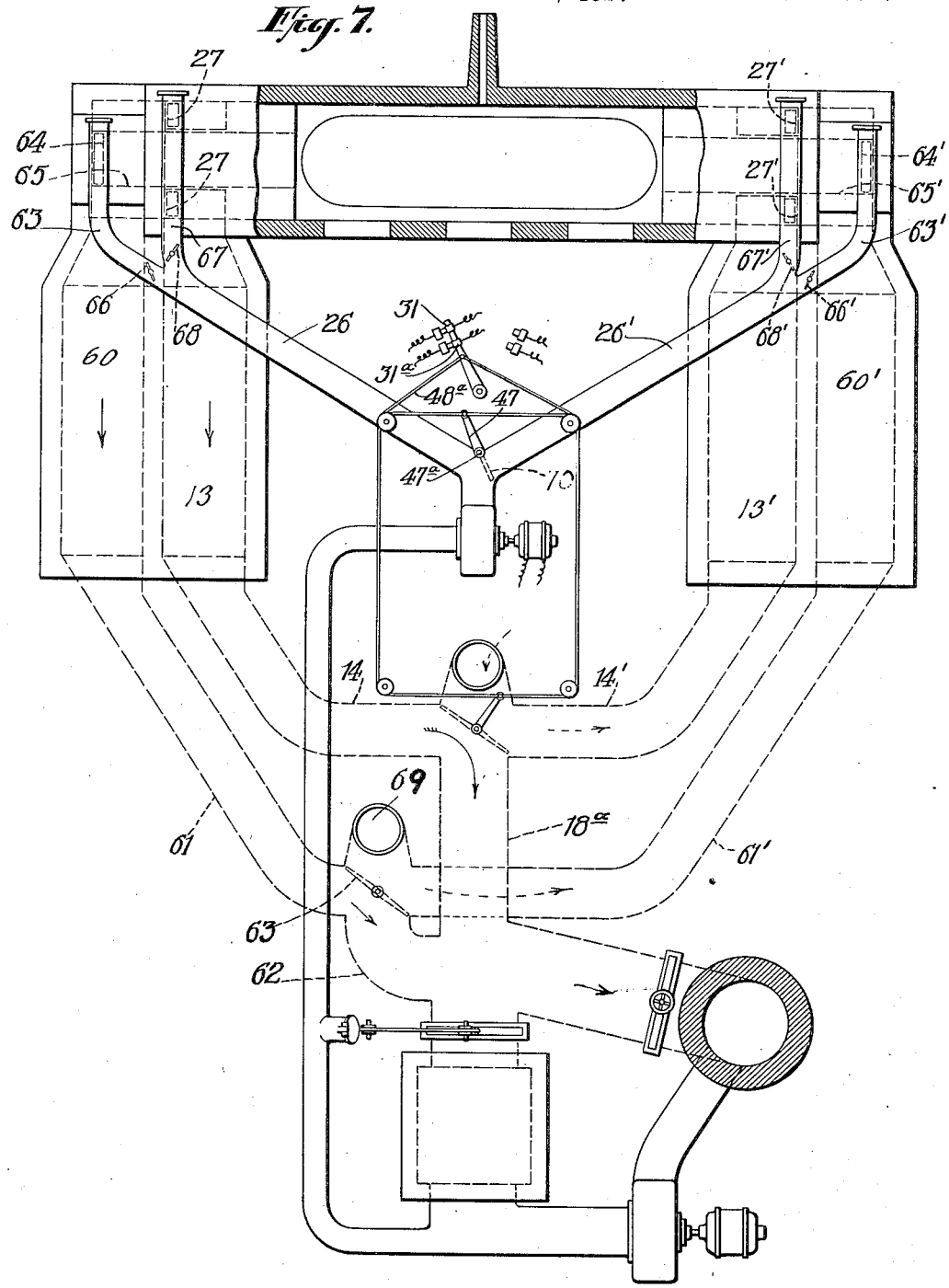

Patented Nov. 16, 1926.

1,606,927

UNITED STATES PATENT OFFICE.

WALDEMAR DYRSSEN, OF TARRYTOWN, NEW YORK.

METHOD OF OPERATING OPEN-HEARTH FURNACES.

Application filed March 13, 1924. Serial No. 698,969.

Open hearth furnaces, as built and operated today, are of the reversible regenerative type. That is, the flow of gases through the furnace is reversed periodically. The two ends of the furnace are called port ends and connect with slag pockets and so-called regenerators or checker chambers. The regenerators or checker chambers are used to store heat from the waste gases and after reversal of the flow of gases to give up this heat to combustion air, and in some cases, to producer gas also.

The temperature of the waste gases leaving the melting chamber and entering the port ends is frequently so high, that the brickwork in the port ends and in the downtakes is destroyed very quickly, if not protected by cooling the brick walls from the outside by air or by water cooling devices inside the brick walls. This necessary cooling of the port ends and the downtakes represents a very large heat loss in open hearth practice and it also causes a large drop in temperature of the waste gases between the melting chamber and the regenerators. I have noticed that the drop in temperature of the waste gases between the melting chamber and the slag pockets is usually from three hundred to four hundred degrees F., but in some instances, is as high as five hundred or six hundred degrees.

I have also noticed that the temperature at the beginning of a heat when the scrap charge has to be melted down, is very much lower than at the end of the heat when the steel is melted and the bath is at a very high temperature.

I have noticed that the temperature of the waste gases from the melting chamber at the beginning of a heat may 2500° or lower and at the end of the heat may be over 3000° F. I have also noticed that the above temperature of the waste gases from the melting chamber in the beginning of a heat does not damage the brick walls in the port ends and downtakes and that the cooling effect of air or water on these parts of the furnace structure is not necessary during this part of the heat. The usual air and the water cooling of the port ends and downtakes causes, therefore, during this part of the heat an unnecessary drop in the temperature of the waste gases before they reach the checker chamber. Hence checker chambers are not so hot in the beginning of a heat as desirable. In fact, I have noticed that the top of the checker chambers and the slag pockets actually cool down in the beginning of a heat from the previous heat. The combustion air in the beginning of a heat is, therefore, not preheated to as high temperature as desirable. This cause inefficient combustion in the furnace with an unnecessary high fuel consumption.

To overcome the above objections, I propose to employ a new method and means for cooling the gases, which consists of mixing the gases from the melting chamber with cool gases at a point as close to the melting chamber as possible. I also propose to partly insulate the port ends and the downtakes and to dispense with water cooling, except where absolutely necessary.

I propose to cool the gases only during periods of the heats when the waste gases from the melting chamber are of such a temperature that they would melt and damage the brick walls of the port ends and downtakes. These periods of the heat occur when the charge is melted and when the bath is being worked and made ready to tap. During such periods, I propose to introduce such an amount of cool gases that the waste gases will be cooled down to a point where they do not damage the brickwork and I propose to introduce so much cool gases during these periods that the waste gases, when they arrive at the checker chambers, will be of about the same temperature as they are in ordinary practice during the same periods. In the beginning of the heat, however, I do not intend to introduce cool gases and the temperature of the waste gases will, therefore, be considerably higher when they reach the regenerator chambers when operating according to my method, than they would be in ordinary practice.

I will, therefore, be able to preheat the combustion air to a higher temperature, on the average than is practical in ordinary practice. This will result in saving considerable fuel per ton of steel. I will also increase the steam output from the waste heat boilers where they are used as the heat which I save by minimizing the reduction of heat lost in cooling water and in radiation from the port ends and downtakes, will ultimately be recovered as steam in the waste heat boiler.

The invention will be understood from the following detailed description when read in connection with the accompanying drawings in which—

Fig. 1 is a plan view of an open hearth furnace embodying my invention;

Fig. 2 is a vertical section on line 2—2 of Fig. 1;

Fig. 3 is a section on line 3—3 of Fig. 2;

Fig. 4 is a section on line 4—4 of Fig. 1;

Fig. 5 is a diagram illustrating graphically the temperatures in an open hearth furnace operated according to the usual or standard practice.

Fig. 6 is a similar diagram illustrating the temperatures when using the apparatus herein disclosed and operating the furnace in accordance with my improved method;

Fig. 7 is a plan showing my invention applied to a furnace in which the fuel as well as the air is preheated before entering the melting chamber.

Referring first to Figs. 1 to 4 of the drawings I have shown conventionally an open hearth furnace provided with the usual melting chamber 9, doors 10, tapping spout 11 and port ends 12 and 12'. Communicating with the port ends of the furnace are usual regenerator chambers 13 and 13' the latter connecting by means of flues 14 and 14' with the stack 18. Communication between the regenerator chambers and the stack is controlled by a reversing valve 15 adapted to be operated in a manner to be hereinafter more fully described. Air can be supplied to either of the regenerators through a port 16 depending upon the position of the reversing valve 15. A branch flue 17 connects the stack 18 with a flue 18ª leading to the waste heat boiler 20. Passage of gas to the stack 18 is controlled by a valve 19 in the flue 17 and the passage of gas to the waste heat boiler is controlled by a valve 21 which as hereinafter described is operatively connected with a hinged cover adapted when open to admit air to the suction side of a fan or blower 25 to be more fully referred to. The waste gases leave the boiler 20 by way of a flue 22 and part of these gases are withdrawn by a motor driven fan 23 and discharged through a suitable flue 23ª to the stack 18. Part of the gases from the boiler are drawn by a motor driven fan 25 through a pipe 24 which communicates with said flue 22. Connected to the fan 25 are pipes 26 and 26' leading respectively to the left and right ends of the furnace as shown in plan in Fig. 1. The flow of gas to either end of the furnace is controlled by the position of the valve 70. The pipes 26 and 26' extend over the top of the port ends of the furnace and communicate therewith by means of nozzles 27 and 27' as best shown in Fig. 2, these nozzles being located directly above the downtakes 28 and 28' which latter communicate with the slag pockets 28ª and 28ᵇ. The slag pockets are connected by suitable flues with the regenerator chambers 13 and 13' as will be understood.

A thermo-couple 29 projects through the roof of the regenerator 13 and a similar thermo-couple 29' projects through the roof of the regenerator 13'. These devices are connected by wires as shown with contact points which are adapted to coact with contacts carried by a rocker or switch arm 30. The contact points 31 and 31ª carried by the arm 30 are connected by wires 31ᵇ and 31ᶜ to suitable terminals on a temperature indicating instrument shown at 32. The indicator hand 44 of this device is adapted to close a circuit through either the contact point 33 or contact 34 through a small motor 35 adapted to drive a screw 36 through suitable reduction gearing 37. Rotation of the screw 36 will move a traveling arm 38 over different contact points on a resistance coil 39.

The motor 35 is connected to the positive feed wire 40 of the supply circuit by wires 40ª and 40ᵇ and the arm 38 is also connected with the positive feed wire by a wire 40ᶜ. The right end 41 of the resistance coil 39 is connected by a wire 41ª with the motor 42 which is arranged to drive the fan 25. This motor is connected by a wire 41ᵇ with the negative line 43. The feed screw 36, arm 38 and resistance 39 are so arranged that when the arm 38 travels to the limit of its movement to the left as indicated by dotted lines at 45, the circuit between the said arm 38 and the resistance 39 is broken.

The reversing valve 15 is operated by an arm 46 which is connected by means of wire ropes or chains 48 and 48' with an arm 47 secured to the pivot 47ª of the valve 27. Cables 48ª and 48ᵇ are connected to the cables 48 and 48' respectively and fastened at an intermediate point to the swinging contact arm 30.

In operation, assuming the gases to flow first through the melting chamber from right to left in the direction of the arrows $x$ in Fig. 2, as they leave the port ends 12 at the left of the furnace they make a substantially or approximately right angular turn flowing downward into the downtake 28. At the zone in which the hot gases make this downward bend or turn I introduce cool gases through pipe 26 and the nozzles 27 and 27'. This mixture flows through the downtake 28 and slag pocket 28ª to the regenerator chamber 13, through flue 14 to the boiler 20 (the reversing valve 15 being in the position shown at this time and the valve 21 being open and the valve 19 closed). Part of the waste gases which have passed through the boiler 20 to the flue 22 are drawn through the pipe 24 by the fan 25 and forced through the pipe 26 (valve 70 at this time being in the position shown) these gases being discharged from the nozzle 27 as above stated. The contact arm 30 with the gases flowing in the direction described, makes a circuit through the thermo-couple 29 passing through the roof of the left regenerator 13. It follows that with the contact arm 30 in this position the temperature indicating instrument 32 will be actuated in response to temperature changes of the left regenerator 13. Similarly it will be appreciated that if the contact arm 31 is swung to the right the temperature indicating instrument 32 will be responsive to temperature changes in the right-hand regenerator 13'. Normally the indicating hand 44 of the instrument 32 is in neutral position, that is to say is does not make contact with either of the points 33 or 34, hence the motor 35 and traveling contact arm 38 are normally stationary. Under these conditions the motor 42 will drive the fan 25 at a substantially constant speed. However, if for any reason the temperature in the upper part of the regenerator is appreciably increased, the thermo-couple 29 (as illustrated) will close a circuit which will cause the hand 44 of the instrument 32 to close the circuit from the negative feed wire 43 through wire 41$^b$ and said contact hand 44, contact 34, wire 41$^c$, limit switch 41$^d$ and motor 35. This will cause the motor to rotate in such direction that the feed screw will be turned to feed the arm 38 toward the right thus cutting out resistance as it travels. This will speed up the motor 42 and fan 25 and hence deliver a greater quantity of cooled gas from the boiler to the port end 12 of the furnace. This action will result in reducing the temperature of the hot gases coming from the melting chamber until the temperature of such gases is substantially or approximately the same as it was before the temperature increase referred to. A similar action will take place if the temperature in the zone of the thermo-couple 29 drops. Under these conditions the hand 44 will move to the left and close the circuit through contact 33 and limit switch which will cause the motor 35 to rotate in the opposite direction thus cutting in more resistance in the circuit of the fan motor 42 and hence smaller quantities of cool waste gases are delivered through the nozzle 27 at the port end, and the temperature will rise to the determined or desired operating point. With this arrangement it is apparent that the speed of the fan is regulated automatically. This permits me to definitely control the temperature in the upper part of the checker chambers so that the temperature therein cannot exceed or fall below certain predetermined points. By changing the position of contacts 33 and 34 it will be appreciated that I can operate at the most efficient temperatures to suit varying conditions of practical operation.

It is evident that at the beginning of a heat, the temperature will at no time during the reversals be as high as the maximum temperature permitted in the upper part of the regenerator chambers. At the beginning of the heat the contact arm 38 travels to the left as far as it can go (as indicated in dotted lines in Fig. 1) hence the current to the fan motor 42 is cut off thus stopping the discharge of cooling gases through the nozzles 27 (or 27'). When the arm 38 reaches either extreme position at right or left it opens the corresponding limit switch 41$^d$ or 41$^c$ thereby breaking the circuit of the motor 35 to prevent damage to the motor or the feed screw 36 and its driving mechanism. By this arrangement it will be perceived that the temperature of the waste gases from the melting chamber is regulated automatically so that it never exceeds a certain maximum predetermined temperature which can be varied at will. It is desirable to have this maximum temperature set as high as possible without burning out or otherwise damaging the brickwork in the port ends and downtakes of the furnace.

In the previously described operation it was assumed that the gases were flowing through the melting chamber from the right to the left end as viewed in Figs. 1 and 2. When the flow is reversed the valve 15 will be swung in the direction of arrow $x$ (counter-clockwise) through an angle of approximately 90° so that air flows through port 16 into the left side of the furnace and waste gases flow from the right side of the furnace to the boiler 20. The arm 46 swings counter-clockwise and through the cables 48 and 48' swings the arm 47 clockwise thus reversing the position of valve 70. This will close communication between the fan 25 and pipe 26 and open communication between said fan and the pipe 26'. This will cause the cool waste gases to be introduced through the nozzle 27' at the right end of the furnace. At the same time because of the cable connections 48$^a$ and 48$^b$ the switch arm 30 will be swung to the right thereby bringing the contacts 31 and 31$^a$ into engagement with the terminals connected with the thermo-couple 29'. It is apparent that under these conditions the instrument 32 will be operated in response to temperature variations in the regenerator 13'. For a short interval immediately following the reversal of the furnace the temperature of the thermo-couple 29' (or the thermo-couple 29) is lower than the maximum temperature at which the fan 25 operates. This results in stopping the fan for a minute (or even a few minutes after each reversal) until the waste gases from the melting chamber have time to heat up the corresponding (right) end of the furnace.

When the boiler 20 is not to be operated the valve 21 will be closed and the valve 19 will be opened so as to permit the passage of waste gases directly to the stack 18. Under these operating conditions the cooling of the port ends of the furnace is accomplished by forcing atmospheric air through the nozzles 27 and 27' instead of supplying waste gases which have been passed through the waste heat boiler as above described. As shown in Fig. 4 the valve 21 is operatively connected with a hinged valve 51 secured to a branch 50 leading from the pipe 24. It is apparent that when the valve 21 is lowered the cable 21ª which passes over the suitable guide sheaves shown in Fig. 4, will cause the hinged valve 51 to open to admit atmospheric air.

The furnace illustrated is adapted to fuel such as coke oven gas, natural gas, tar, oil, or powdered coal, these fuels being introduced on each side of the port ends of the furnace through pipes 49 and 49'. The invention can also be applied to furnaces using producer gas for fuel in which case the gas will be preheated in another pair of checker chambers. The application of my improved method to furnaces using producer gas is somewhat more complex as the waste gases from the melting chamber are divided into two parallel streams, one to the air regenerators and the other to the gas regentrators (as illustrated somewhat diagrammatically in Fig. 7 and hereinafter described more fully). Cool waste gases would then be introduced by separate nozzles into both these streams and the relative quantities would depend upon the size of the streams. In other words the quantity of cooling gas would be regulated according to the volume of the streams of waste gas flowing from the outgoing end of the melting chamber to the gas and air regenerators. The simplest way of applying my method to furnaces having gas and air regenerators is to regulate the amount of cooling gases by the use of pyrometers located in the top of the air regenerators as described in the foregoing, and to regulate the relative quantities of cool mixing gases supplied to the air and gas regenerators by suitable dampers in the pipes leading to the nozzles through which the cooling gases are introduced. For obtaining the best results, however, the dampers for the nozzles which cool the waste gases passing to the gas regenerators should be automatically regulated by pyrometers in the top of the gas regenerators.

In Fig. 7 I have shown in plan a furnace adapted for use with fuel such as producer gas which must be preheated before entering the melting chamber. Various parts of the apparatus are practically duplicates of those heretofore described and are identified by the same reference characters. The furnace illustrated in this figure is adapted to use producer gas as fuel and is therefore provided with gas regenerators 60 and 60' and with air regenerators 13 and 13' which are connected by flues 14 and 14' with a flue 18ª substantially the same as that shown in Fig. 1. The gas regenerators 60 and 60' are connected by flues 61 and 61' with a branch flue 62 communicating with the flue 18ª as shown. A suitable reversing valve 63 is provided so that gas coming through the supply flue 69 can be alternately supplied to opposite ends of the furnace. Likewise the waste gases can be passed through the regenerators at opposite ends of the furnace as will be understood. The pipes 26 and 26' are provided with branches 63 and 63' respectively which lead to nozzles 64 and 64' which are adapted to discharge the cooling air or gas into the gas downtakes 65 and 65'. The branches 63 and 63' are provided with regulating valves or dampers 66 and 66'. And branches 67 and 67' of the pipes 26 and 26' are provided with similar valves 68 and 68'.

The advantages of my invention will be readily appreciated by consideration of the temperature charts identified as Figs. 5 and 6. Fig. 5 shows graphically the waste gas and combustion air temperatures as they usually exist in a furnace operating according to the conventional or usual methods of operation, and Fig. 6 is a similar chart illustrating the temperatures of the waste gases and combustion air in a furnace built in accordance with my invention and operating according to my improved method.

Referring first to Fig. 5, the first curve marked 1, represents the average temperature of the waste gases from the melting chamber during a nine hour heat. At the beginning of the heat, the temperature is 2500 degrees and gradually rises until 3000 degrees is reached. The second curve, marked 2, represents the temperature of the same waste gases, as they pass into the slag pockets. This temperature is 300 degrees lower than the waste gases from the melting chamber at the beginning of the heat, and 400 degrees lower at the end of the heat. The third curve, marked 3, represents the temperature of the combustion air as it enters the melting chamber. This temperature is from 100 to 300 degrees lower than the temperature of the waste gases from the melting chamber. These curves represent the average temperature at different periods of the heat and it must be understood that the temperature varies during the time between each reversal, so that the curves in actual practice would have a wave form where the complete wave would have a length corresponding to the time between two reversals.

In Fig. 6, the first curve (4) is the same as curve 1 in Figure 5. The second curve (5) shows the temperature of the waste gases arriving at the slag pockets when no cool gases are introduced. This temperature is from 100 to 150 degrees lower than represented by curve 4. This drop in temperature is about one-third of the drop represented by curves 1 and 2 in Figure 1, and this small drop, which is obtained in my method of operating, is due to the absence of water cooling and part insulation of the port ends and downtakes. The third curve (6) represents the temperature of the waste gases arriving at the slag pockets after the proper amount of cool gases have been mixed in. At the beginning of the heat this temperature is the same as represented by curve 5, as no cool gases are introduced, but at the end of the heat, the difference between these two temperatures is about 250 degrees, which represents the drop as shown by curve 6 due to introduction of cool waste gases.

In comparing curve 2, Figure 5, with curve 6, Figure 6, it can be seen that at the beginning of the heat, this temperature is about 200 degrees higher in Figure 6 than in Figure 5, but at the end of the heat, the temperature is the same. In other words, by my method the temperature of the waste gases arriving at the slag pockets is considerably higher at the beginning of the heat as compared to ordinary practice, but at the end of the heat they are the same, and no more damage will be done to the brick walls when operating according to my method than in ordinary operation, but at the beginning of the heat, my checker chambers will be hotter. Thus it is apparent that by my method the air will be preheated to a higher temperature in the beginning of the heat which will save fuel. Curve 7 represents the temperature of the air as obtained by my method. The average temperature of the air for a whole heat will be about 150 degrees higher than in ordinary practice. The curve (8) in Figure 6, shows the percentage of cool gases or air introduced into the waste gases from the melting chamber at different times of the heat in order to cool down the gases to the temperature represented by curve 6. In this case, it has been assumed that gases or air of about 62 degrees F. had been introduced or mixed with the waste gases. If, for instance, waste gases from a waste heat boiler, at a temperature of about 500 degrees were introduced, instead of cool gases, it would be necessary to introduce about twenty-five percent more gas than the percentage represented by curve 8.

From the foregoing it is apparent that I can supply combustion air to the furnace at a higher temperature than that possible with ordinary methods and apparatus. It is also apparent that during certain periods of operation I can take off the waste gases at the port ends of the furnace at a temperature considerably higher than the temperatures at which these gases are usually carried to the slag pockets because of the absence of water cooling devices. It is also apparent that a saving of fuel will be effected because of the higher temperature at which the combustion air enters the port ends of the furnace.

Though I have described with great particularity a specific type of open hearth furnace and associated apparatus and specific steps in the method of operating the furnace it is not to be construed that I am limited thereto as various modifications and variations may be made by those skilled in the art without departing from the invention set forth with particularity in the appended claims.

What I claim is:—

1. The method of operating an open hearth furnace which consists in supplying fuel and combustion air alternately to opposite ends of the furnace, passing the waste gases alternately from each end of the furnace through a waste heat boiler to recover the heat energy therefrom and to cool said gases, mixing part of the gases so cooled with the gases leaving the outgoing end of the furnace so as to prevent the destruction of the port ends of the furnace.

2. In the operation of an open hearth furnace the method which consists in passing the hot waste gases from one end of the furnace through a regenerator chamber and a waste heat boiler, mixing part of the gases from the waste heat boiler with the gases flowing from the outgoing end of the furnace so as to reduce the temperature of said waste gases and thereby prevent destruction of the furnace ports.

3. In combination with an open hearth furnace and a boiler adapted to be heated by the waste gases from said furnace, means for mixing part of the waste gases passed through said boiler with the gases leaving said open hearth furnace to cool said gases to prevent their destructive action on the port walls and flues at the outgoing end of the furnace.

4. In combination with an open hearth furnace and regenerators communicating with the melting chamber thereof, means responsive to temperature changes in said regenerators for automatically mixing a cooling medium with the waste gases leaving the outgoing end of the furnace.

5. In combination with an open hearth furnace and the regenerators thereof, means for mixing a cooling medium with the waste gases at points between the melting chamber and said regenerators and means responsive to temperature changes in said regenerators for controlling the supply of said cooling medium.

6. In combination with an open hearth furnace and the regenerators, a boiler arranged to be heated by the waste gases from the melting chamber of said furnace, means for mixing part of the gases passed through said boiler with the gases leaving the melting chamber of the furnace at a point between the latter and said regenerators so as to minimize the destructive action of said waste gases.

7. In combination with an open hearth furnace and the regenerators thereof, means for mixing a cooling medium with the waste gases at points between the melting chamber and said regenerators and means responsive to temperature changes of the waste gases for controlling the rate at which the cooling medium is mixed with said waste gases.

8. In combination with an open hearth furnace and the regenerators thereof, pipes for conveying a cooling medium to the ports at opposite ends of the furnace, a reversing valve for determining the end of the furnace at which the cooling medium will be discharged, motor driven means for forcing the cooling medium through said pipe, and means responsive to temperature changes for controlling said motor driven means.

9. In combination with an open hearth furnace and the regenerators thereof, pipes for conveying a cooling medium to the ports at opposite ends of the furnace, a reversing valve for determining the end of the furnace at which the cooling medium will be discharged, a reversing valve controlling the direction of travel of waste gases through said furnace and its regenerators, means for synchronizing the movements of both mentioned reversing valves, motor driven means for forcing the cooling medium through said pipe, and means responsive to temperature changes for controlling said motor driven means.

10. In combination with an open hearth furnace and the regenerators connected therewith, means for reversing the direction of travel of the waste gases through said furnace and regenerators, means for utilizing the heat of the gases discharged from said regenerators, means for conveying and discharging part of the gases passed through the last named means into the gas stream at a point between the furnace melting chamber and the regenerators, means for forcing the gases through said pipes, a motor for driving the latter and electrically operated means responsive to temperature changes of the waste gases for controlling the speed of said motor.

11. In the operation of an open hearth furnace the method which consists in supplying fuel and air at one end of the furnace and mixing a cooling medium with the outgoing gases at the opposite end of the furnace, the quantity of said cooling medium being gradually increased from zero at the start of the heat to a maximum at the end of the heat.

12. In the operation of an open hearth furnace the method which consists in supplying fuel and air at one end of the furnace and mixing at a substantially constant rate an increasing quantity of a cooling medium with the outgoing gases as the heat progresses.

In witness whereof, I have hereunto signed my name.

WALDEMAR DYRSSEN.